T. ALLATT.
CORK FEEDING DEVICE.
APPLICATION FILED APR. 29, 1920.

1,386,485.

Patented Aug. 2, 1921.
7 SHEETS—SHEET 1.

INVENTOR
T. Allatt
BY
Sigmund Herzog
ATTORNEY

T. ALLATT.
CORK FEEDING DEVICE.
APPLICATION FILED APR. 29, 1920.

1,386,485.

Patented Aug. 2, 1921.
7 SHEETS—SHEET 2.

Inventor
T. Allatt
By his Attorney
Sigmund Herzog

T. ALLATT.
CORK FEEDING DEVICE.
APPLICATION FILED APR. 29, 1920.
1,386,485.
Patented Aug. 2, 1921.
7 SHEETS—SHEET 3.
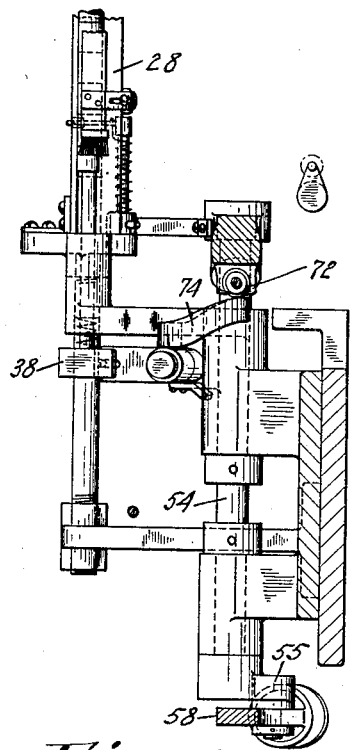
Fig. 6.
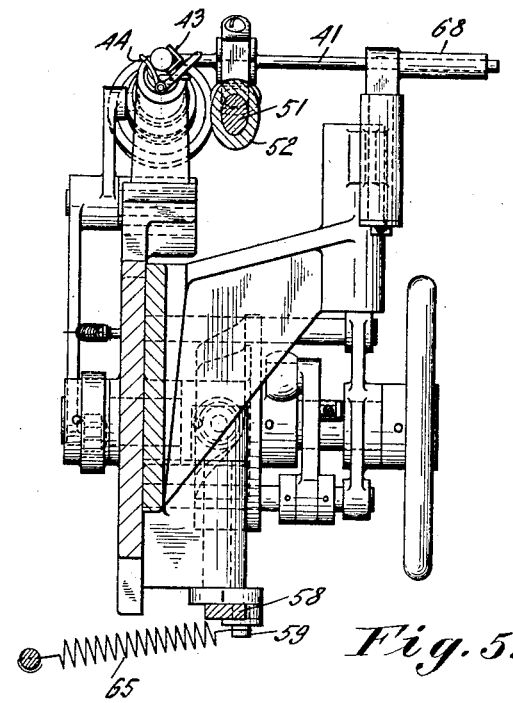
Fig. 5.
Fig. 15.
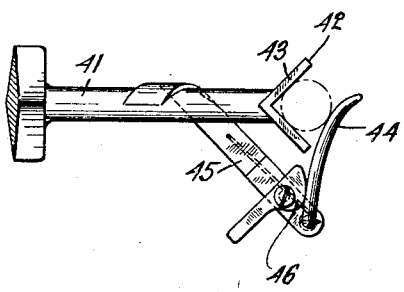
Fig. 16.
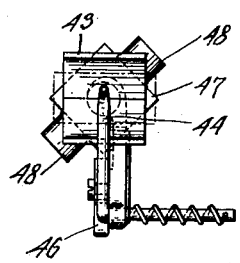
Inventor
T. Allatt
By his Attorney
Sigmund Herzog

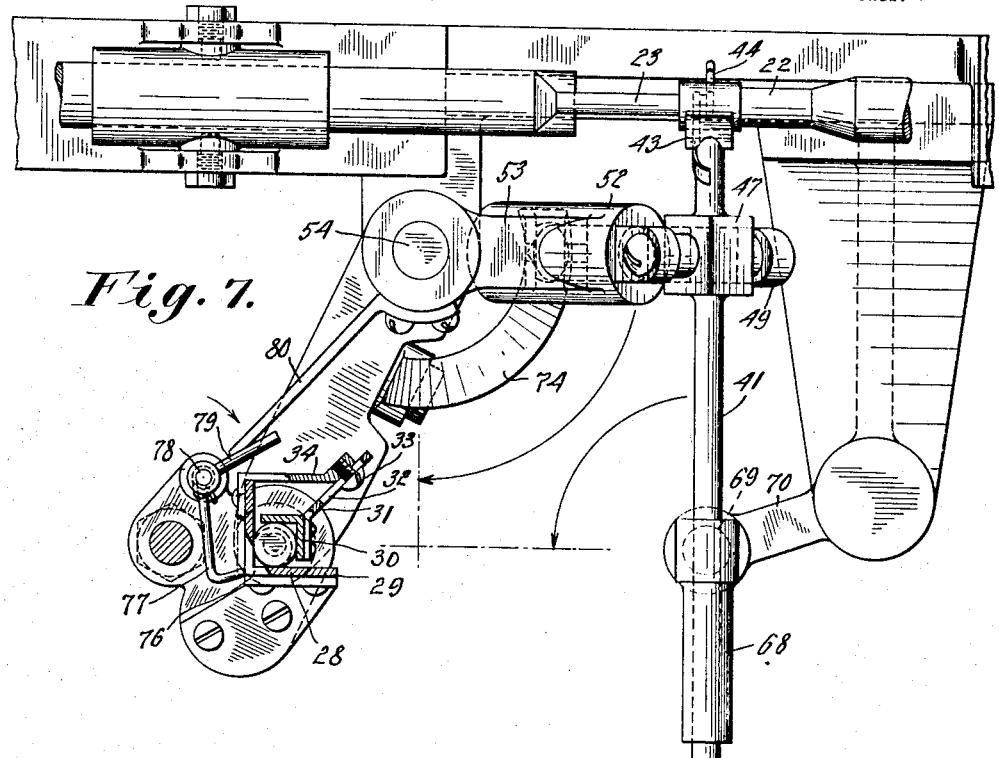
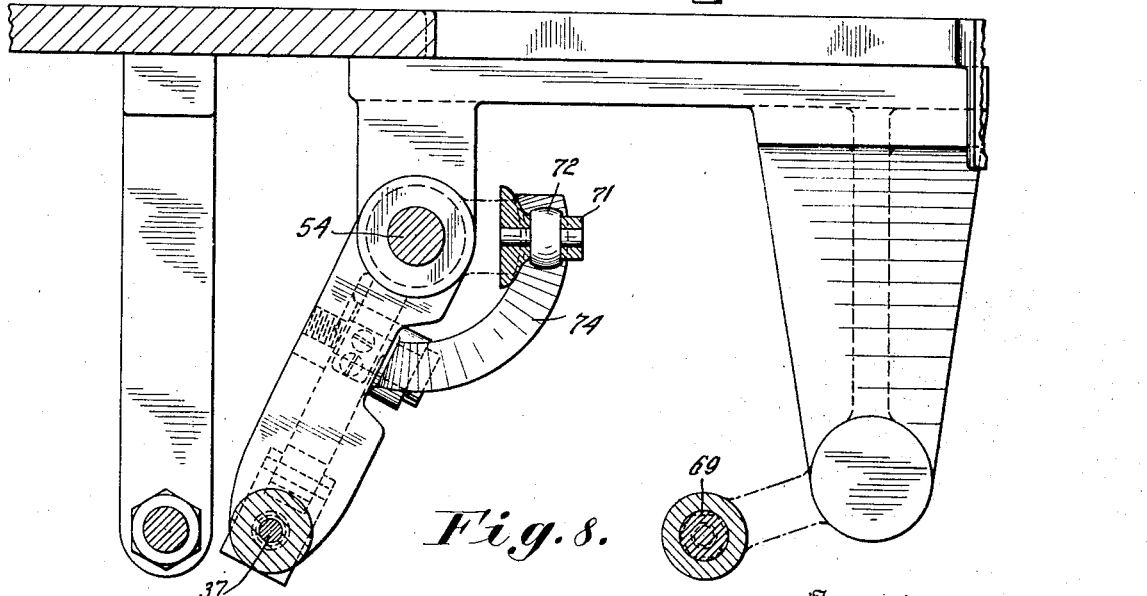

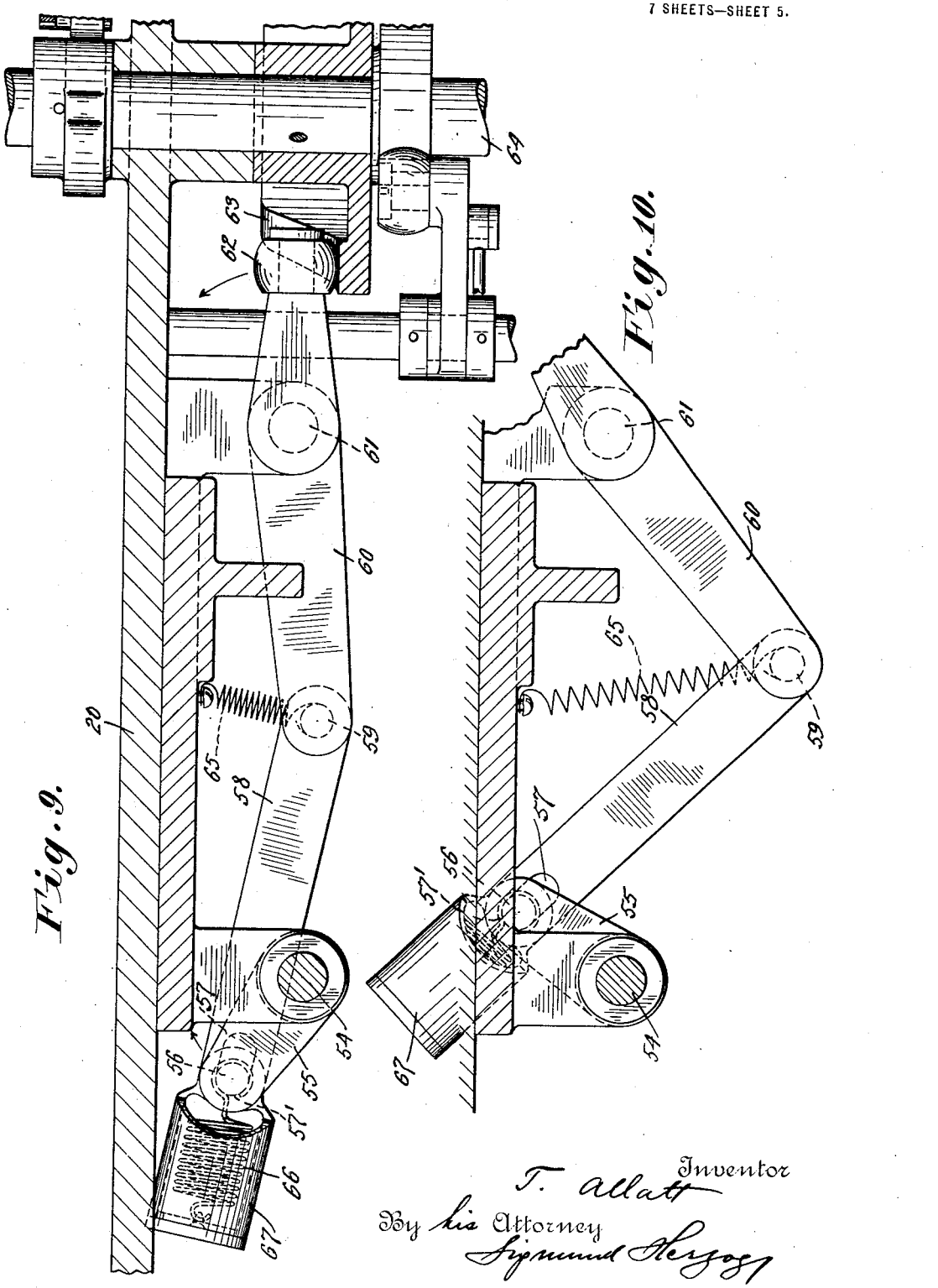

T. ALLATT.
CORK FEEDING DEVICE.
APPLICATION FILED APR. 29, 1920.

1,386,485.

Patented Aug. 2, 1921.
7 SHEETS—SHEET 6.

Inventor
T. Allatt
By his Attorney
Sigmund Herzog

T. ALLATT.
CORK FEEDING DEVICE.
APPLICATION FILED APR. 29, 1920.

1,386,485.

Patented Aug. 2, 1921.
7 SHEETS—SHEET 7.

INVENTOR
T. Allatt
BY
Sigmund Herzog
ATTORNEY

UNITED STATES PATENT OFFICE.

THOMAS ALLATT, OF WESTFIELD, NEW JERSEY, ASSIGNOR TO INTERNATIONAL CORK COMPANY, OF BROOKLYN, NEW YORK, A CORPORATION OF NEW YORK.

CORK-FEEDING DEVICE.

1,386,485.

Specification of Letters Patent.

Patented Aug. 2, 1921.

Application filed April 29, 1920. Serial No. 377,667.

*To all whom it may concern:*

Be it known that I, THOMAS ALLATT, a subject of the King of Great Britain, and a resident of Westfield, in the county of Union and State of New Jersey, have invented certain new and useful Improvements in Cork-Feeding Devices, of which the following is a specification.

The present invention relates to cork feeding devices, designed to feed corks to cork tapering machines. Cork tapering machines usually comprise a rotary knife, in combination with a rotary work holder, the corks being presented singly to the latter, to be held thereby in operative relation to the knife.

The present invention relates to a cork presenting mechanism, that picks up the corks, one after the other, in a chute and delivers the same to the work holder, the main object of the invention being to provide a device of this type, which is simple in construction, efficient in operation, and which functions entirely automatically.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 2:
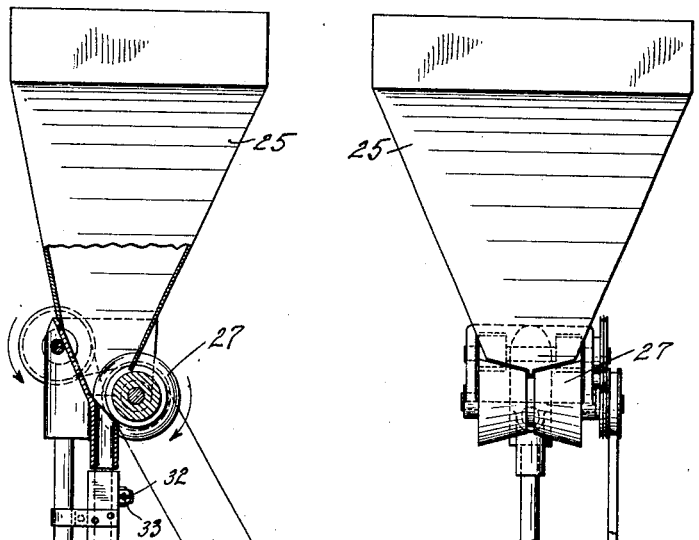
Figure 1:
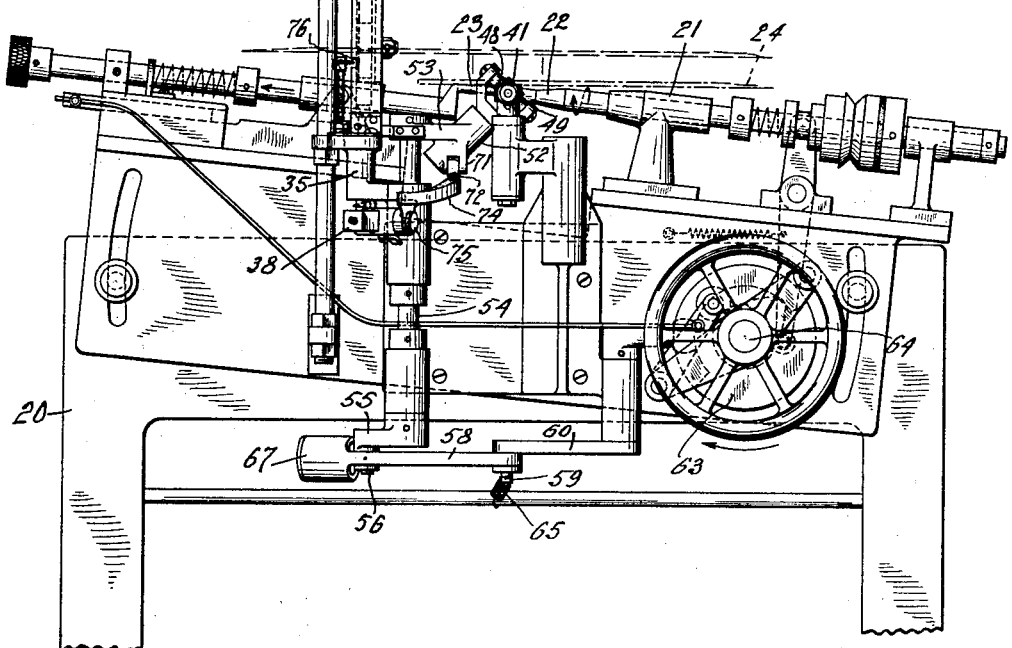
Figure 3:
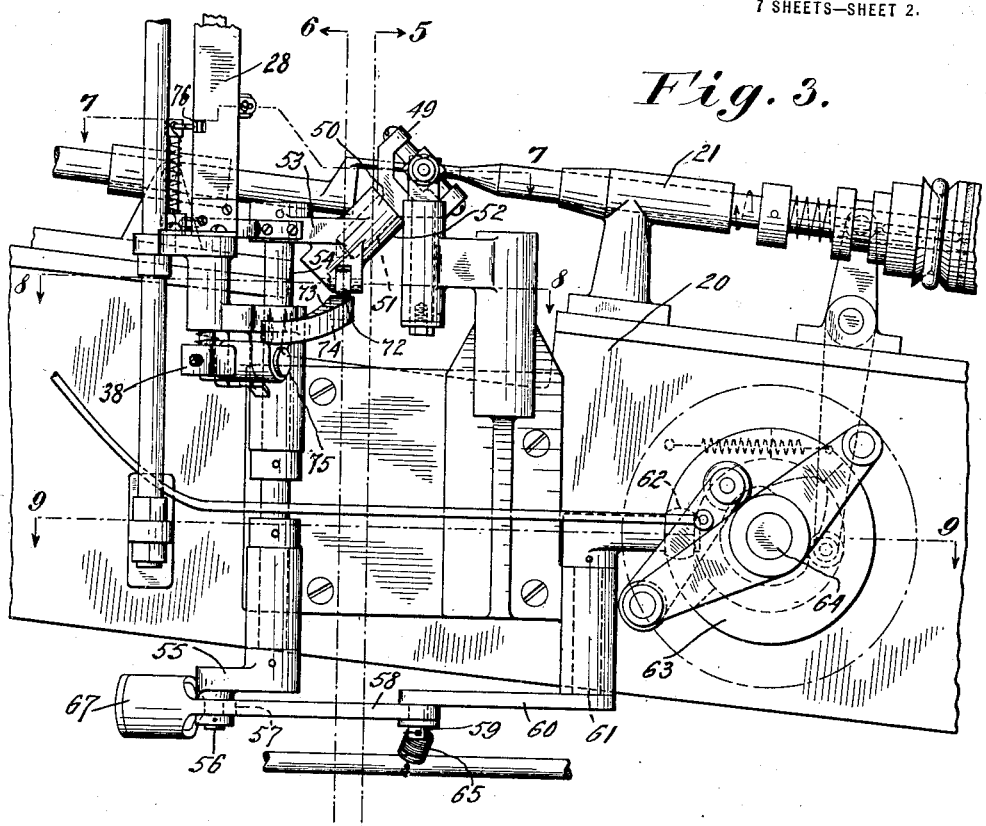
Figure 4:
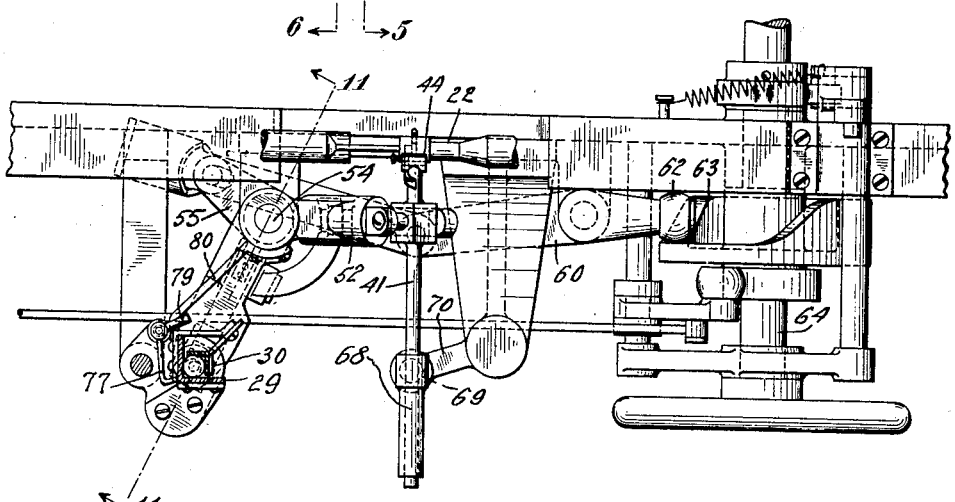
Figure 11:
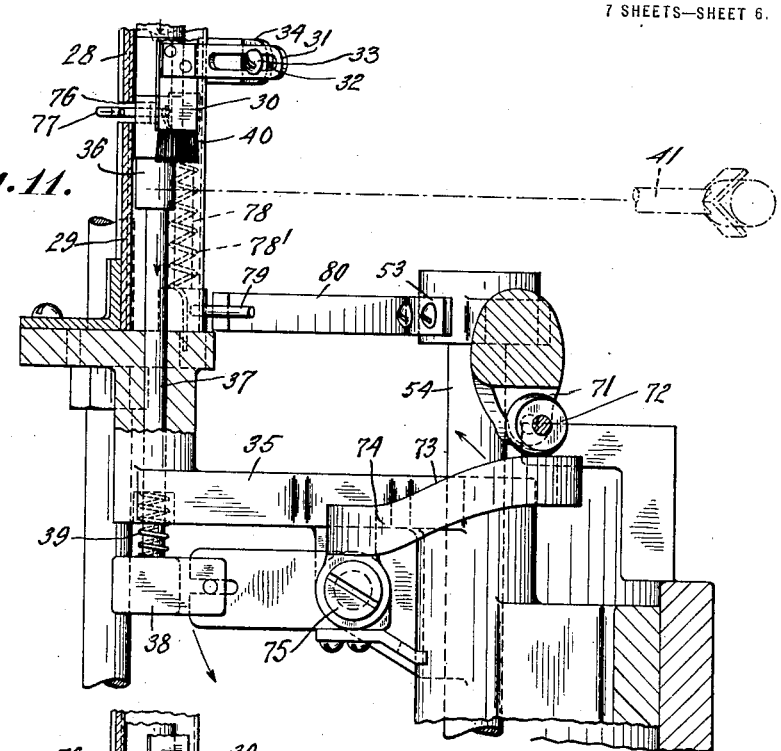
Figure 14:
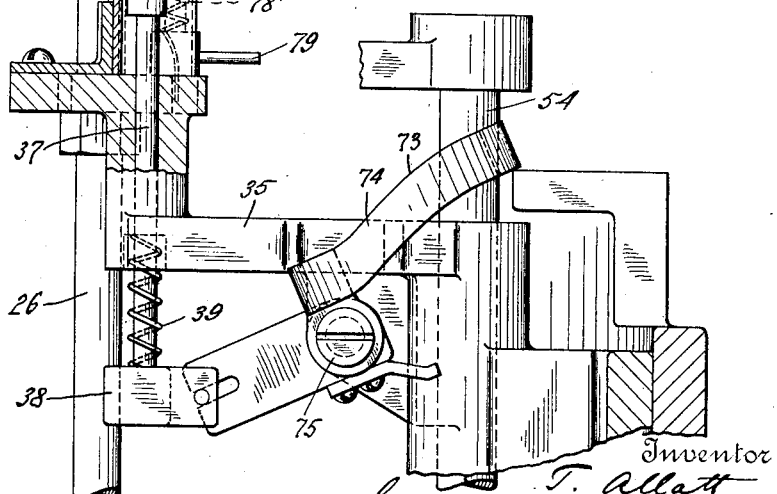
Figure 12:
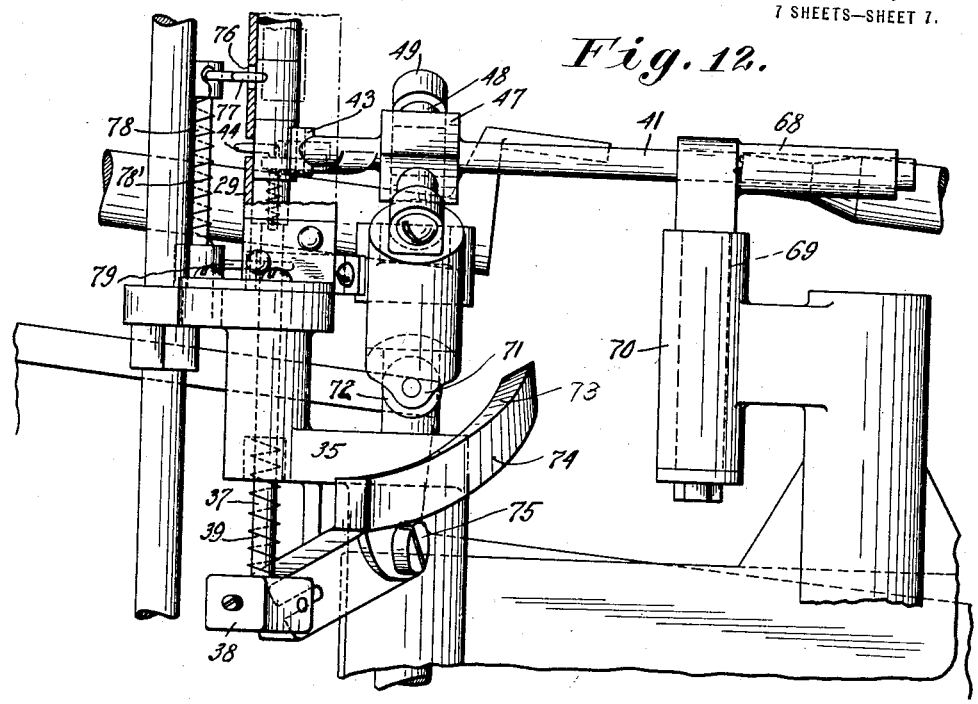
Figure 13:
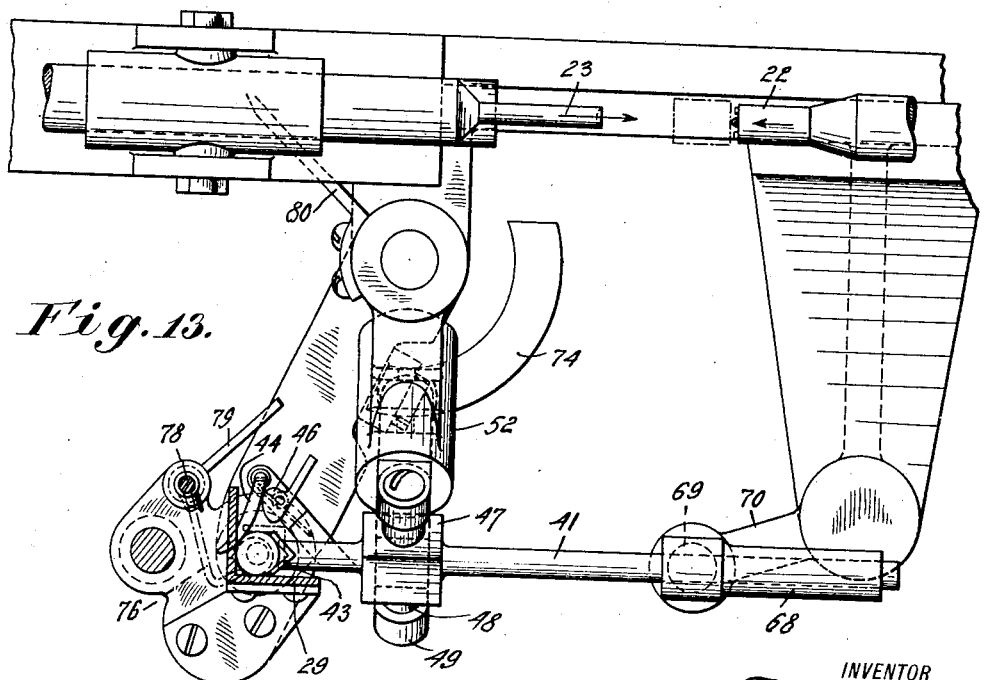

Figure 1 is a front elevation of a portion of a cork tapering machine, with the improved cork presenting attachment thereon; Fig. 2 is a side elevation of a hopper, from which the corks are caused to move into the chute; Fig. 3 is a front elevation of the cork presenting mechanism on a larger scale; Fig. 4 is a top elevation of the device shown in Fig. 3; Fig. 5 is a section taken on line 5—5 of Fig. 3; Fig. 6 is a section taken on line 6—6 of Fig. 3; Fig. 7 is a section taken on line 7—7 of Fig. 3, on a larger scale; Fig. 8 is a section taken on line 8—8 of Fig. 3, also on a larger scale; Fig. 9 is a section taken on line 9—9 of Fig. 3, on a larger scale; Fig. 10 is an elevation of some of the elements shown in Fig. 9, in other positions; Fig. 11 is a section taken on line 11—11 of Fig. 4, on a larger scale; Fig. 12 is a front elevation of a portion of the cork presenting means, showing the latter in the position in which it picks up a cork from the chute; Fig. 13 is a top elevation of the device shown in Fig. 12; Fig. 14 is a section similar to the one shown in Fig. 11, showing the elements in other positions; Fig. 15 is a top plan of the gripping mechanism of the cork presenting device, on a larger scale; and Fig. 16 is a front elevation of the detail shown in Fig. 15.

In the drawings, the numeral 20 indicates the frame of a cork tapering machine, on which is mounted a work holder 21, that comprises two arbors 22 and 23. These arbors are rotated in any suitable manner, they being reciprocable, gripping and releasing alternately the cork presented to them. The means for rotating and reciprocating said arbors are herein not described. The arbors extend at a slight angle to the horizontal plane and engage the cork centrally at its opposite flat faces, holding the same in operative relation to a rotary disk cutter 24, which, due to the angular relation of the work holder, tapers the cork.

The corks are indiscriminately placed into a hopper 25, that is disposed a suitable distance above the work holder, it being mounted upon a standard 26, the latter being fixed to the machine frame. From this hopper the corks are moved by a suitable mechanism 27 into a vertically extending tube 28, that is adjustable in size according to the size of the corks to be fed. As appears from the several figures of the drawings, particularly from Fig. 7, the tube includes a vertically disposed angle-iron 29, fixed to the standard 26, and also a vertically disposed angle-iron 30, that is shiftable in relation to the stationary angle-iron 29, whereby the cross-section of the tube is adapted to be varied, to accommodate corks of different sizes. The angle-iron 29 is provided with lugs 31, having slots 32, through which extend clamping screws 33 into lugs 34 on the stationary angle-iron 29. The slots 32 extend horizontally, as clearly appears from Fig. 1 of the drawings. The lower end of the tube rests upon a bracket 35, fixed to the machine frame, and is provided with a bottom 36, on which the corks, that are stacked in the tube, are adapted to rest. This bottom is reciprocable in the direction of the longitudinal axis of the tube, for a purpose which will hereinafter appear. The bottom is carried by a rod 37, slidably disposed in the bracket 35 and provided, below the said bracket, with a head 38. Against this head and against the bracket bears a spring 39, having a tendency to keep the movable bottom in its lowermost position, as shown in Figs. 12 and 14 of the drawings. Above the movable bottom 36, the angle-iron 30 is cut away, as shown at 40, to permit the lowermost of the corks in the tube to be gripped by the cork presenting mechanism.

The cork presenting mechanism comprises a horizontally disposed spindle 41, which is provided upon one of its ends with a gripping mechanism 42, shown in detail in Figs. 15 and 16. This gripping mechanism includes a fixed recessed jaw 43 and a spring-pressed movable jaw 44, the latter being carried by a projection 45 on the said spindle, its movement toward the fixed jaw 43 being limited by a cam 46, that is adjustable, to adapt the gripping device to corks of varying sizes. Adjacent the gripping device, the spindle 41 is provided with an enlargement 47, from which project, at diametrically opposite points of the spindle, trunnions 48, the latter being rotatably mounted in the prongs 49 of a fork 50. The body portion 51 of this fork is made in the form of a spindle, that is oscillatably mounted in a support 52. This support extends at an angle of 45 degrees to the vertical line, and the trunnions 48 extend at right angles to the longitudinal axis of the said support, as clearly appears from Fig. 3 of the drawings. The support 52 is provided with a horizontally extending arm 53, which is fixed to a vertically extending spindle 54, the latter being oscillatably mounted in the bracket 35 above referred to. The last-mentioned spindle is provided at its lower end with a crank arm 55, having a vertical pin 56 extending into a slot 57 of a link 58, which is pivoted at 59 to a lever 60. This lever is fulcrumed at 61 to the machine frame and carries upon its free end an anti-friction roller 62, in engagement with a cam 63 upon a rotary shaft 64 of the cork tapering machine. A spring 65, connected with the pivot 59 and with the machine frame, has a tendency to keep the roller 62 continuously in engagement with the cam 63. A spring 66, in engagement with the pin 56 and an extension 67 of the link 58, keeps the outer edge 57' of the slot 57 in engagement with the pin 56, and prevents breakage of the parts in case of undue strain on the link 58 and lever 60. The spindle 41 extends slidably through a guide 68, carried by a vertically extending spindle 69, the latter being oscillatably mounted in a bracket 70.

The support 52 carries a lug 71, upon which is mounted an anti-friction roller 72, the latter being adapted to act upon the cam face 73 of a lever 74. This lever is fulcrumed at 75 to the bracket 35 and in operative engagement with the head 38 on the rod 37, above referred to.

A suitable distance above the cut-away portion 40 of the tube 28, there is provided in the angle-iron portion 29 thereof an opening 76, through which is adapted to project a finger 77, fixed to a spindle 78, that is oscillatably mounted in the bracket 35 and provided with a rearwardly extending projection 79. This projection is adapted to coöperate with a lug 80, the latter being attached to the arm 53 of the support 52. A spring 78' upon the spindle 78 has a tendency to move the finger 77 into engagement with the corks.

The cam 63 is so timed in relation to the mechanism, which causes the arbors 22 and 23 to approach each other and to recede from one another, that the lever 60 and link 58 cause the support 52 to move toward the tube 28 into the position shown in Fig. 13 of the drawings, while the said arbors hold a cork in operative relation to the cutter 24, causing the said arbors to recede from each other while the support 52 is moved toward the arbors into the position shown in Fig. 7 of the drawings, the arbors moving toward each other into gripping positions while the cork presenting mechanism is in the position shown in Fig. 7.

The operation of the device is as follows:—A mass of corks, to be fed to the tapering machine, is placed into the hopper 25, the size of the tube 28 having been previously adjusted to accommodate the corks. The mechanism 27, which does not form part of the present invention, stacks the corks in the said tube. The cam 46 on the projection 45 of the spindle 41 must, of course, be set so as to allow the movable jaw to approach the stationary jaw 43 a distance corresponding substantially to the diameter of the corks.

When the elements are in the positions shown in Figs. 1, 3, 4 and 7, a cork, held between the jaws of the cork presenting mechanism, is disposed substantially horizontally, to be gripped by the arbors 22 and 23 in their movement toward each other. In these positions of the elements, the fixed jaw 43 extends horizontally, as clearly shown in Fig. 7 of the drawings, and the support 52 is disposed in proximity of the said arbors. The elements, actuating the crank arm 55, occupy then the positions shown in Fig. 9 of the drawings. The movable bottom 36 of the tube 28 is in its raised position (Fig. 11), the lever 74 having been swung around its pivot 75 into the position shown in the said figure by the roller 72 acting on the cam face 73 thereof. As appears from Fig. 7 of the drawings, the lug 80 has swung the projection 79 in the direction of the arrow shown in the said figure, thereby disengaging the finger 77 from the lowermost cork in the tube, permitting the entire row of corks to drop onto the movable bottom 36.

Rotation being imparted to the cam 63 and to the elements which cause a reciprocating motion of the arbors 22 and 23, the said arbors are moved toward each other and grip the cork, the cam 63, in its continued rotation, causing the crank arm 55 to move from the position shown in Fig. 9 of the drawings into the position shown in Fig. 10, with the result that the support 52 is swung from the position shown in Fig. 7 into the position shown in Fig. 13 of the drawings. By this movement, first, the lug 80 is disengaged from the projection 79, whereby the finger 77 is caused, by the spring 78' coöperating therewith, to engage that cork in the tube 28 which is disposed immediately above the lowermost cork therein. A further rotation of the cam disengages the roller 72 from the cam face 73 of the lever 74, whereby the spring 39 causes the movable bottom 36 of the tube 28 to move downward, that is to say from the position shown in Fig. 11 into the position shown in Fig. 14 of the drawings, thereby bringing the lowermost cork into alinement with the cut-away portion 40 in the said tube. As now the support 52 completes its movement toward the tube, it swings the spindle 41 around the spindle 69 ninety degrees into the position shown in Fig. 13 of the drawings, at the same time moving the spindle 41 around its own axis approximately 90 degrees, so that its fixed jaw 43 is disposed vertically, ready to receive, with the movable jaw 44, the vertically disposed cork on the tube bottom 36. The movable jaw, when coming into engagement with the cork, is first swung slightly outward, its spring swinging the same into gripping position.

A further rotation of the cam causes then the support to swing back into the position shown in Fig. 7 of the drawings, during which movement the spindle is given a turn of about 90 degrees around its own axis, thereby bringing the cork into horizontal position into operative relation to the arbors 22 and 23. During this movement, the roller 72 acts on the cam face 73 of the lever 74, thereby raising the bottom 36 against the action of the spring 39, in which position it is ready to receive the lowermost cork in the tube, the same being released in the manner above described by the action of the lug 80 on the projection 79.

From the foregoing it appears that the spindle 41 is not only moved bodily around the spindle 69, but also given a quarter of a turn around its own axis during each swing thereof. This movement is due to the fact that the spindle 41 is engaged at two points, that is to say by the guide 68 and by the fork 50. The guide permits the spindle to move in a horizontal plane, while the fork 50, which swivels in the support 51, gives the spindle a quarter of a turn around its own axis.

The mechanism for holding the stack of corks in the tube a slight distance above the lowermost cork is provided in order to prevent a removal of more than one cork, at a time, from the tube. The bottom of the tube, on the other hand, is lowered, before the cork resting thereon is being removed, in order to prevent friction as the said cork is withdrawn.

What I claim is:—

A cork cutting machine, including a workholder consisting of two arbors for engaging a cork at its flat faces and holding the same substantially horizontally, a tube in which the corks are stacked vertically one on top of another, said tube being spaced from said arbors and provided adjacent its lower end in the plane of said arbors with a discharge opening, a spindle swiveling around a vertical pivot having gripping jaws adapted to engage the corks in said tube at their cylindrical faces, and means for oscillating said spindle around its pivot, thereby causing the same to move from said tube to said arbors, and vice versa, and giving said spindle during each movement a quarter of a turn around its own axis, whereby the corks received in vertical position are presented to said arbors in horizontal position.

Signed at New York, in the county of New York and State of New York, this 29th day of December, 1919.

THOMAS ALLATT.